No. 763,739. PATENTED JUNE 28, 1904.
T. & L. EDWARDS.
AUTOMATIC VEHICLE BRAKE.
APPLICATION FILED MAR. 10, 1904.
NO MODEL. 2 SHEETS—SHEET 1.
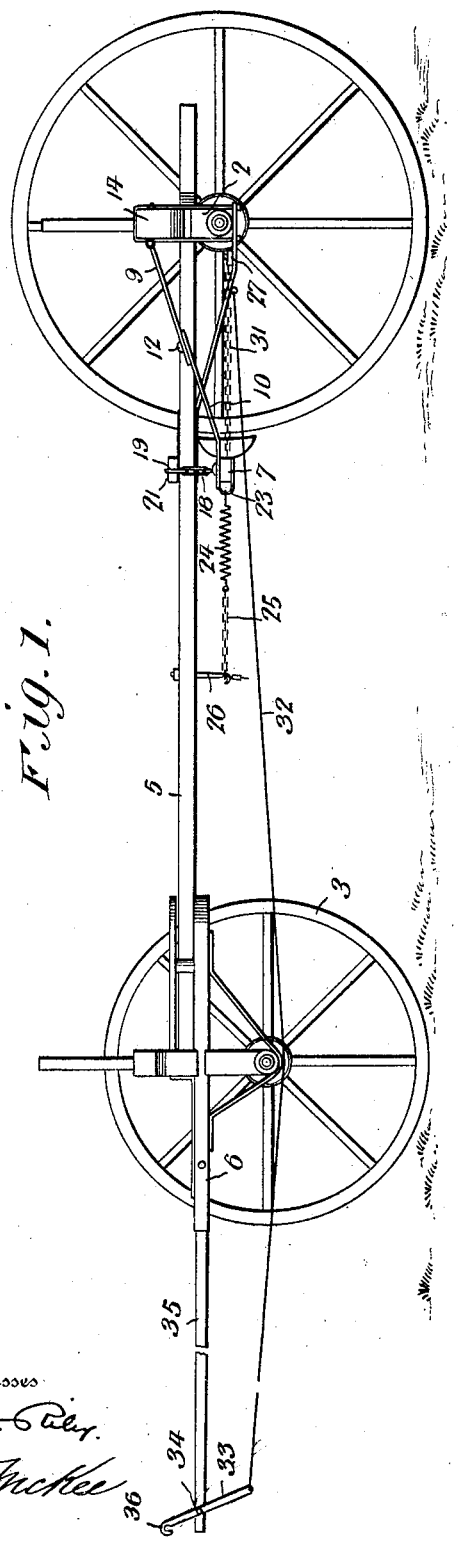
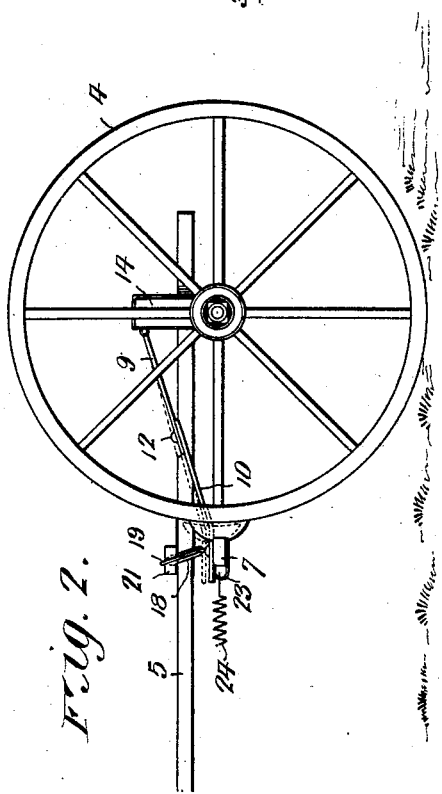
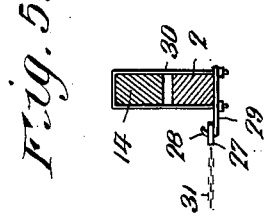
Witnesses
F. W. Oler.
E. G. McKee.
Inventors
Thomas Edwards.
Luke Edwards
By Rexford M. Smith,
Attorney.

No. 763,739. PATENTED JUNE 28, 1904.
T. & L. EDWARDS.
AUTOMATIC VEHICLE BRAKE.
APPLICATION FILED MAR. 10, 1904.
NO MODEL. 2 SHEETS—SHEET 2.
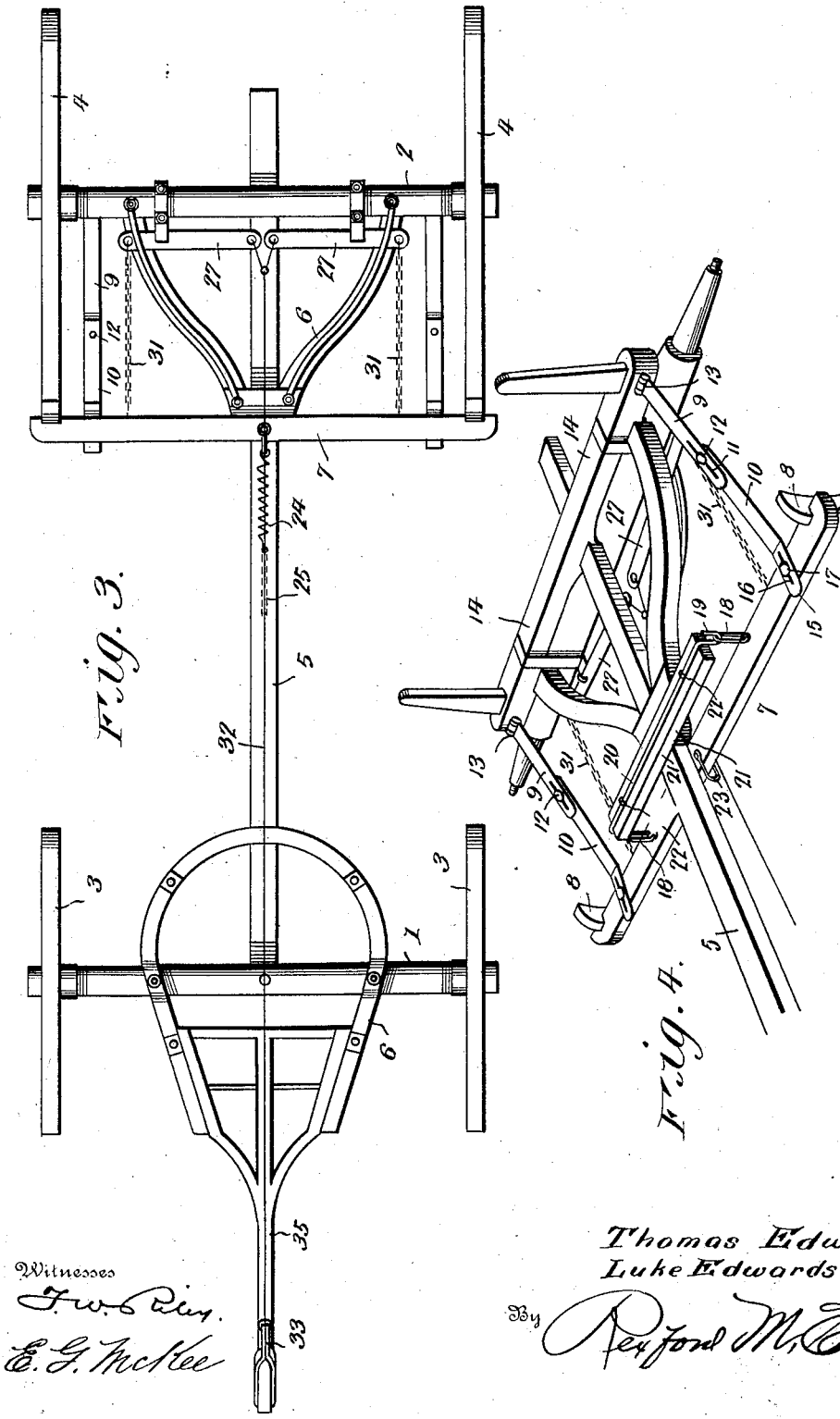
Witnesses
Inventors
Thomas Edwards.
Luke Edwards
By Rexford M. Smith,
Attorney.

UNITED STATES PATENT OFFICE.

THOMAS EDWARDS AND LUKE EDWARDS, OF IRONHILL, IOWA.

AUTOMATIC VEHICLE-BRAKE.

SPECIFICATION forming part of Letters Patent No. 763,739, dated June 28, 1904.

Application filed March 10, 1904. Serial No. 197,412. (No model.)

*To all whom it may concern:*

Be it known that we, THOMAS EDWARDS and LUKE EDWARDS, citizens of the United States of America, residing at Ironhill, in the county of Jackson and State of Iowa, have invented a certain new and useful Automatic Vehicle-Brake, of which the following is a specification, reference being had therein to the accompanying drawings.

This invention relates to automatic brakes for vehicles, the object of the invention being to provide brake mechanism applicable to an ordinary wagon or like vehicle and adapted to be operated by the backward pull of the team, so that the brakes are automatically applied to the vehicle-wheels while descending a grade, the brake mechanism being of such nature and the parts thereof being so combined and arranged that while backing upon level ground the brake-shoes will be relieved from contact with the wheels, thus allowing the wheels to rotate backward without interference on the part of the brake mechanism.

The invention also has reference to the construction and arrangement of the parts of the brake whereby the said brake mechanism is self-adjusting and whereby the pressure of the brake-shoes upon their respective wheels is equalized and the braking force properly distributed to secure the best results. By means of the construction hereinafter described the liability of the shoes to jam against the wheels is avoided and the relief of the pressure of the shoes against the wheels insured at the proper time.

With the above and other objects in view, the nature of which will more fully appear as the description proceeds, the invention consists in the novel construction, combination, and arrangement of parts, as herein fully described, illustrated, and claimed.

In the accompanying drawings, Figure 1 is a side elevation of the running-gear of a wagon, showing the brake mechanism of this invention applied thereto. Fig. 2 is a partial side elevation of the same, illustrative of the action of the brake shoes and beam and the contiguous parts. Fig. 3 is a bottom plan view of Fig. 1. Fig. 4 is a perspective view of a portion of the running-gear of the wagon adjacent to the rear wheels, showing the brake-beam and operating connections. Fig. 5 is a detail vertical section through the rear axle, showing the manner of supporting the brake-levers.

Like reference-numerals designate corresponding parts in all the figures of the drawings.

Referring to the drawings, I have therein shown a wagon truck or gear comprising front and rear axles 1 and 2, respectively, front and rear wheels 3 and 4, respectively, and the usual reach-pole 5 and hounds 6.

In carrying out the present invention resort is had to a brake-beam 7, provided at opposite ends with suitable brake-shoes 8, adapted to be moved into and out of contact with the rear wheels 4. At or near its opposite ends the brake-beam is supported by means of longitudinally-extensible hangers, each of which consists of two overlapping bars or members 9 and 10, one of the bars being slotted, as shown at 11, while the other bar is provided with a bolt or other suitable fastener 12, thereby enabling the said hangers to be adjusted in length for the purpose of properly positioning the brake beams and shoes with respect to the wheels. At their rear ends the hangers are hinged, as shown at 13, to the rear bolster 14, while the forward ends of the hangers are provided with horizontal extensions 15, longitudinally slotted, as shown at 16, to receive pins or studs 17, connected with the brake-beam 7. By the construction just described the brake-beam 7 is adapted to have a limited amount of free movement relative to the end portions of the hangers, and it will also be observed that said brake-beam is capable of swinging upward and downward by reason of the hinged connection 13. The beam 7 is further supported by means of vertically-elongated links 18, which are connected at one end directly to the beam 7, while their upper ends are adapted to play up and down in terminal hooks or stirrups 19 at the opposite ends of a rock-shaft 20, which extends lengthwise of a cross-bar or saddle 21, extending transversely of the reach-pole 5, as best illustrated in Fig. 4, the said rock-shaft being journaled in suitable eyes or bearings 22, thus enabling the hooks or stirrups 19 to swing for the purpose of enabling the beam and supporting-links to adjust themselves for bringing the brake-shoes 8 into proper relation to the wheels 4.

About centrally the brake-beam 7 is provided with an eye or clevis 23, to which is connected one end of the relief-spring 24, having connected to its opposite or forward end an adjusting-chain 25, any one of the links of which may be connected with a stationary hook 26, connected to and extending downward from the reach-pole 5, as best shown in Fig. 1. The brake-shoes may thus be given a normal tendency away from the wheels, and the tension of the relief-spring 24 may be nicely adjusted.

In order to apply the brakes, resort is had to a pair of oppositely-arranged brake-levers 27, each of which is fulcrumed at a point intermediate its ends on a hook 28, carried by the forwardly-projecting end of a tie-plate 29, which straddles the lower threaded and nutted ends of a strap or clip 30, which passes over and embraces the rear axle and bolster, as shown in Fig. 5. By reference to Fig. 4 it will be seen that two of said combined clips and lever-supports are employed. It will also be seen that the outer or opposite ends of the levers 27 are connected to the brake-beams 7 by means of brake-chains 31, while the inner ends of the levers are connected to the rear end of a flexible brake connection 32, which extends forward, preferably beneath the front axle, and is connected at its forward extremity to the lower arm of an operating-lever 33, which is fulcrumed intermediate its ends at 34 on the vehicle-tongue 35 and provided at its upper end with a hook 36 or its equivalent, to which the neck-yoke of the team is connected, so that when the team holds back the lever 33 will be vibrated, thereby drawing forward on the connection 32, rocking the brake-levers 27, and through the medium of the chains 31 drawing the brake-shoes against the wheels.

It will be observed that the brake-chains hold the beam toward the wheels, while the relief-spring has the reverse tendency, and the hangers while capable of swinging, and thereby drawing the beam toward the wheels, which action is due to the fact that the hangers are pivoted above the rear axle, are also slotted to permit the beam to yield relatively to the wheels when in action and also adjust itself to the wheels, so as to equalize the braking effect on both wheels. It will also be noted that the beam-supporting links while permitting the beam to move upward also limit the downward movement and arrest the descent of the beam before the beam reaches the outward limit of its movement on the hangers. This avoids any liability of the shoes jamming against the wheels and locking the same and insures the immediate relief of the shoes when the rest of the brake mechanism is relieved of tension.

It will be understood that by reason of the particular construction and arrangement of the parts of the brake mechanism the brake-shoes will be automatically applied to the wheels by the backward pull or resistance of the team while descending a grade. At the same time when the vehicle is being backed on level ground the brake-shoes will be relieved, so as to admit of the backing of the vehicle. This relief to the brake-shoes is due to the fact that in backing the wheels 4 are turned in a reverse direction and as the shoes move on the hinges 13 as a center their tendency is to leave the wheel-rims, and such tendency is assisted by the spring 24. It will also be apparent that changes in the form, proportion, and minor details of construction may be resorted to without departing from the principle or sacrificing any of the advantages of the invention.

Having thus described the invention, what is claimed as new is—

1. An automatic brake for vehicles comprising a brake-beam provided with brake-shoes, longitudinally-extensible hangers hinged to the running-gear of the vehicle at points above the axle and having the brake-beam slidingly connected therewith, an operating-lever fulcrumed on the vehicle-tongue and adapted to be operated by the team, and brake connections between said operating-lever and the brake-beam for moving the beam toward the wheels, substantially as described.

2. An automatic brake for vehicles comprising a brake-beam provided with shoes, hangers to which the beam is slidingly connected, said hangers being hinged to the running-gear of the vehicle above the axle, a rock-shaft journaled on the running-gear and provided with terminal hooks or stirrups, slotted supporting-links connecting the beam with said hooks or stirrups, an operating-lever adapted to be actuated by the team, and connections between said lever and brake-beam for moving the latter toward the wheels, substantially as described.

3. An automatic brake for vehicles comprising a brake-beam provided with shoes, slotted and extensible hangers to which the brake-beam is slidingly connected, said hangers being hinged to the running-gear above the axle, an operating-lever adapted to be actuated by the team, connections between said operating-lever and the brake-beam for moving the latter toward the wheels, a relief-spring connected to the beam for moving the latter away from the wheels and means for adjusting the tension of said spring, substantially as described.

4. An automatic brake for vehicles comprising a brake-beam provided with shoes, hangers hinged to the running-gear above the axle and having the brake-beam slidingly connected therewith, an operating-lever adapted to be actuated by the team, and brake connections interposed between said operating-lever and the brake-beam, said connections comprising one or more brake-levers, and a supporting-fulcrum for each lever consisting of a clip or strap engaging the axle, and a tie-plate forming part of the clip and provided with a projecting hook or fulcrum-pin upon which the brake-lever is mounted, substantially as described.

In testimony whereof we affix our signatures in presence of two witnesses.

THOMAS EDWARDS.
    LUKE EDWARDS.

Witnesses:
 Mrs. J. W. SAGERS,
 JOHN B. GILMORE.